United States Patent
Gill

(10) Patent No.: US 7,330,339 B2
(45) Date of Patent: Feb. 12, 2008

(54) STRUCTURE PROVIDING ENHANCED SELF-PINNING FOR CPP GMR AND TUNNEL VALVE HEADS

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 570 days.

(21) Appl. No.: 10/627,506

(22) Filed: Jul. 25, 2003

(65) Prior Publication Data

US 2005/0018365 A1    Jan. 27, 2005

(51) Int. Cl.
*G11B 5/39* (2006.01)

(52) U.S. Cl. ................. 360/324.11; 360/322; 324/252; 338/32 R

(58) Field of Classification Search ........... 360/324, 360/324.1, 324.11, 324.12
See application file for complete search history.

(56) References Cited

U.S. PATENT DOCUMENTS

| | | | | |
|---|---|---|---|---|
| 5,491,600 A * | 2/1996 | Chen et al. | ............. | 360/322 |
| 5,668,688 A | 9/1997 | Dykes et al. | ............. | 360/113 |
| 5,708,358 A * | 1/1998 | Ravipati | ............. | 324/252 |
| 5,729,410 A | 3/1998 | Fontana, Jr. et al. | ......... | 360/113 |
| 5,742,459 A * | 4/1998 | Shen et al. | ............. | 360/327.32 |
| 5,883,764 A * | 3/1999 | Pinarbasi | ............. | 360/322 |
| 6,005,753 A | 12/1999 | Fontana, Jr. et al. | ........ | 360/113 |
| 6,023,395 A | 2/2000 | Dill et al. | ............. | 360/113 |
| 6,219,207 B1 * | 4/2001 | Pinarbasi | ............. | 360/322 |
| 6,256,178 B1 | 7/2001 | Gill | ............. | 360/324.2 |
| 6,266,218 B1 | 7/2001 | Carey et al. | ............. | 360/324.12 |
| 6,301,089 B1 * | 10/2001 | Saito et al. | ............. | 360/324.12 |
| 6,333,842 B1 | 12/2001 | Nobuyuki et al. | ........ | 360/324.2 |
| 6,359,760 B2 * | 3/2002 | Kanno | ............. | 360/322 |
| 6,381,107 B1 | 4/2002 | Redon et al. | ............. | 360/324.2 |
| 6,460,243 B1 * | 10/2002 | Pinarbasi | ............. | 29/603.14 |
| 6,469,879 B1 | 10/2002 | Redon et al. | ............. | 360/324.2 |
| 6,483,676 B2 | 11/2002 | Nakatani | ............. | 360/324.2 |
| 6,791,807 B1 * | 9/2004 | Hikami et al. | ............. | 360/328 |
| 7,016,164 B2 * | 3/2006 | Gill | ............. | 360/324.11 |
| 7,050,273 B2 * | 5/2006 | Horng et al. | ............. | 360/324.1 |
| 7,196,878 B2 * | 3/2007 | Fox et al. | ............. | 360/324.11 |
| 2002/0006020 A1 | 1/2002 | Hasegawa | ............. | 360/324.2 |
| 2002/0012206 A1 * | 1/2002 | Kanno | ............. | 360/322 |
| 2002/0044397 A1 * | 4/2002 | Noma et al. | ............. | 360/324.11 |
| 2002/0097540 A1 | 7/2002 | Hayashi et al. | ......... | 360/324.12 |
| 2002/0135949 A1 | 9/2002 | Gill | ............. | 360/324.2 |
| 2002/0154452 A1 | 10/2002 | Gill | ............. | 360/321 |
| 2002/0159202 A1 | 10/2002 | Yanagiuchi et al. | ..... | 360/324.1 |
| 2003/0021072 A1 | 1/2003 | Hayakawa | ............. | 360/324.2 |
| 2004/0100738 A1 * | 5/2004 | Lahiri et al. | ............. | 360/320 |
| 2005/0237676 A1 * | 10/2005 | Gill | ............. | 360/324.11 |
| 2005/0286178 A1 * | 12/2005 | Gill et al. | ............. | 360/324.2 |
| 2006/0098352 A1 * | 5/2006 | Gill | ............. | 360/324.1 |

FOREIGN PATENT DOCUMENTS

JP        11079180        10/2000

* cited by examiner

*Primary Examiner*—Brian E. Miller
(74) *Attorney, Agent, or Firm*—Zilka-Kotab, PC

(57) ABSTRACT

A magnetic head having improved self-pinning. The head includes a sensor having an antiparallel (AP) pinned layer structure, where the AP pinned layer structure includes at least two pinned layers having magnetic moments that are self-pinned antiparallel to each other, the pinned layers being separated by an AP coupling layer. A pair of compression layers are positioned towards opposite track edges of the sensor. The compression layers provide compressive stress to the sensor.

26 Claims, 14 Drawing Sheets

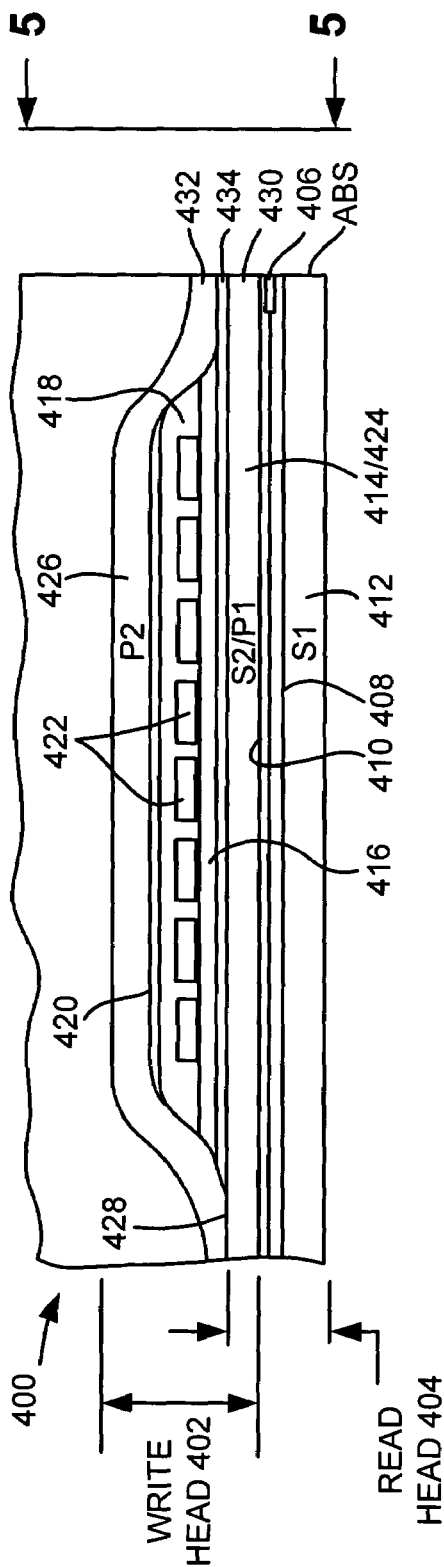
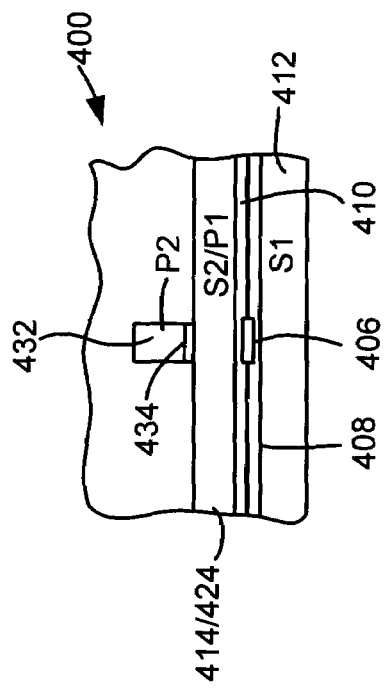
FIG. 4
FIG. 5

STRUCTURE PROVIDING ENHANCED SELF-PINNING FOR CPP GMR AND TUNNEL VALVE HEADS

FIELD OF THE INVENTION

The present invention relates to magnetic heads, and more particularly, this invention relates to reading heads having a new compression layer structure that improves signal and/or pinned layer stability.

BACKGROUND OF THE INVENTION

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

In high capacity disk drives, magnetoresistive (MR) read sensors, commonly referred to as MR heads, are the prevailing read sensors because of their capability to read data from a surface of a disk at greater track and linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flow through the MR element. Recorded data can be read from a magnetic medium because the external magnetic field from the recorded magnetic medium (the signal field) causes a change in the direction of magnetization of the MR element, which in turn causes a change in resistance of the MR element and a corresponding change in the sensed current or voltage.

Another type of MR sensor is the giant magnetoresistance (GMR) sensor manifesting the GMR effect. In GMR sensors, the resistance of the GMR sensor varies as a function of the spin-dependent transmission of the conduction electrons between ferromagnetic layers separated by a non-magnetic layer (spacer) and the accompanying spin-dependent scattering which takes place at the interface of the ferromagnetic and non-magnetic layers and within the ferromagnetic layers. GMR sensors using only two layers of ferromagnetic material (e.g., Ni—Fe) separated by a layer of non-magnetic material (e.g., copper) are generally referred to as spin valve (SV) sensors. In an SV sensor, one of the ferromagnetic layers, referred to as the pinned layer (reference layer), has its magnetization typically pinned by exchange coupling with an antiferromagnetic (e.g., NiO or Fe—Mn) layer. The pinning field generated by the antiferromagnetic layer should be greater than demagnetizing fields (about 200 Oe) at the operating temperature of the SV sensor (about 120° C.) to ensure that the magnetization direction of the pinned layer remains fixed during the application of external fields (e.g., fields from bits recorded on the disk). The magnetization of the other ferromagnetic layer, referred to as the free layer, however, is not fixed and is free to rotate in response to the field from the recorded magnetic medium (the signal field). U.S. Pat. No. 5,206,590 granted to Dieny et al., incorporated herein by reference, discloses a SV sensor operating on the basis of the GMR effect.

An exemplary high performance read head employs a spin valve sensor for sensing the magnetic signal fields from the rotating magnetic disk. FIG. 1A shows a prior art SV sensor 100 comprising a free layer (free ferromagnetic layer) 110 separated from a pinned layer (pinned ferromagnetic layer) 120 by a non-magnetic, electrically-conducting spacer layer 115. The magnetization of the pinned layer 120 is fixed by an antiferromagnetic (AFM) layer 130.

FIG. 1B shows another prior art SV sensor 150 with a flux keepered configuration. The SV sensor 150 is substantially identical to the SV sensor 100 shown in FIG. 1A except for the addition of a keeper layer 152 formed of ferromagnetic material separated from the free layer 110 by a non-magnetic spacer layer 154. The keeper layer 152 provides a flux closure path for the magnetic field from the pinned layer 120 resulting in reduced magnetostatic interaction of the pinned layer 120 with the free layer 110. U.S. Pat. No. 5,508,867 granted to Cain et al., incorporated herein by reference, discloses a SV sensor having a flux keepered configuration.

Another type of SV sensor is an antiparallel (AP)-pinned SV sensor. In AP-Pinned SV sensors, the pinned layer is a laminated structure of two ferromagnetic layers separated by a non-magnetic coupling layer such that the magnetizations of the two ferromagnetic layers are strongly coupled together antiferromagnetically in an antiparallel orientation. The AP-Pinned SV sensor provides improved exchange coupling of the antiferromagnetic (AFM) layer to the laminated pinned layer structure than is achieved with the pinned layer structure of the SV sensor of FIG. 1A. This improved exchange coupling increases the stability of the AP-Pinned SV sensor at high temperatures which allows the use of corrosion resistant antiferromagnetic materials such as NiO for the AFM layer.

Referring to FIG. 2A, an AP-Pinned SV sensor 200 comprises a free layer 210 separated from a laminated AP-pinned layer structure 220 by a nonmagnetic, electrically-conducting spacer layer 215. The magnetization of the laminated AP-pinned layer structure 220 is fixed by an AFM layer 230. The laminated AP-pinned layer structure 220 comprises a first ferromagnetic layer 226 and a second ferromagnetic layer 222 separated by an antiparallel coupling layer (APC) 224 of nonmagnetic material. The two ferromagnetic layers 226, 222 ($FM_1$ and $FM_2$) in the laminated AP-pinned layer structure 220 have their magnetization directions oriented antiparallel, as indicated by the arrows 227, 223 (arrows pointing out of and into the plane of the paper respectively).

A key requirement for optimal operation of an SV sensor is that the pinned layer should be magnetically saturated perpendicular to the air bearing surface. Lack of magnetic saturation in the pinned layer leads to reduced signal or dynamic range. Factors leading to a loss of saturation include demagnetizing fields at the edge of the pinned layer, magnetic fields from recorded data and from longitudinal biasing regions, current induced fields and the coupling field to the free layer.

Analysis of the magnetic state of pinned layers in small sensors (a few microns or less in width), reveals that due primarily to the presence of large demagnetizing fields at the sensor edges the magnetization is not uniform over the area of the pinned layer. FIG. 2B shows a perspective view of an SV sensor 250. The SV sensor 250 is formed of a sensor stripe 260 having a front edge 270 at the ABS and extending away from the ABS to a rear edge 272. Due to the large demagnetizing fields at the front edge 270 and the rear edge 272 of the sensor stripe 260, the desired perpendicular magnetization direction is achieved only at the center portion 280 of the pinned layer stripe, while the magnetization tends to be curled into a direction parallel to the ABS at the edges of the stripe. The extent of these curled regions is controlled by the magnetic stiffness of the pinned layer.

Furthermore, prior art AP-Pinned SV sensors use an AFM in order to pin the pinned layer magnetization. Most commonly used AFM materials have blocking temperatures (temperature at which the pinning field reaches zero Oe) near 200° C. This means that if the temperature of the SV sensor approaches this temperature, the pinned layer magnetization can change its orientation resulting in degraded SV sensor performance.

Although AP-Pinned SV sensors have large effective pinning fields because near cancellation of the magnetic moments of the two sub-layers results in a low net magnetic moment for the pinned layer, thermal stability is still a concern because the operating temperatures of these SV sensors in disk files can exceed 120° C. In addition, the AP-pinned layer structure is vulnerable to demagnetization during processing operations such as lapping.

Therefore there is a need for an SV sensor that increases the magnetic saturation of the pinned layer and reduces the sensitivity to demagnetizing fields particularly at the front and rear edges of the pinned layer stripe. In SV sensors that include AFM layers to provide exchange anisotropy fields to fix the pinned layer magnetization direction, there is a further need for an SV structure that reduces the temperature limitations imposed by the blocking temperature characteristics of the commonly used antiferromagnetic materials required in prior art SV sensors for providing pinning fields.

In any of the prior art sensors described above, the thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of $\cos \theta$, where $\theta$ is the angle between the magnetic moments of the pinned and free layer structures. The sensitivity of the sensor is quantified as magnetoresistive coefficient dR/R where dR is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

The transfer curve of a spin valve sensor is defined by the aforementioned $\cos \theta$ where $\theta$ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields from the magnetic disk.

Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. When the readback signals are asymmetrical, signal output and dynamic range of the sensor are reduced. Readback asymmetry is defined as:

$$\frac{V_1 - V_2}{\max(V_1 \text{ or } V_2)}$$

For example, +10% readback asymmetry means that the positive readback signal $V_1$ is 10% greater than it should be to obtain readback symmetry. 10% readback asymmetry is acceptable in some applications. +10% readback asymmetry may not be acceptable in applications where the applied field magnetizes the free layer close to saturation. The designer strives to improve asymmetry of the readback signals as much as practical with the goal being symmetry.

The location of the transfer curve relative to the bias point is influenced by four major forces on the free layer of a spin valve sensor, namely a ferromagnetic coupling field $H_{FC}$ between the pinned layer and the free layer, a net demagnetizing (demag) field $H_D$ from the pinned layer, a sense current field $H_I$ from all conductive layers of the spin valve except the free layer, a net image current field $H_{IM}$ from the first and second shield layers.

Thus, it would be desirable to create a head with improved self pinning to eliminate the contact resistance caused by the AFM pinning. It would also be desiable to reduce the total stack thickness, allowing the heads to have thinner total read gaps.

SUMMARY OF THE INVENTION

The present invention overcomes the drawbacks and limitations described above by providing a magnetic head having improved self-pinning. The head includes a sensor having an antiparallel (AP) pinned layer structure, where the AP pinned layer structure includes at least two pinned layers having magnetic moments that are self-pinned antiparallel to each other, the pinned layers being separated by an AP coupling layer. A pair of compression layers are positioned towards opposite track edges of the sensor. The compression layers provide compressive stress to the sensor.

The compression layers may be constructed of metal and/or a dielectric material. Preferably, the compression layers are constructed of rhodium, tantalum, tungsten and/or composite of these metals. In a preferred embodiment, the compression layers are positioned substantially outside track edges of the sensor. The compression layers may be substantially aligned with the sensor, or may be positioned above or below hard bias layers.

The head may further include shield layers positioned above and below the sensor, and at least one electrically insulative layer positioned towards each of the compression layers for preventing conduction of electricity through the compression layers from one shield layer to the other shield layer and/or for preventing conduction of electricity through the compression layers from the sensor to one of the shield layers.

Many types of heads can use the structures described herein, and the structures are particularly adapted to CPP GMR sensors, CIP GMR sensors, and CPP tunnel valve sensors for use in a magnetic storage system.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4 is a partial view of the slider and a merged magnetic head.

FIG. 5 is a partial ABS view, not to scale, of the slider taken along plane 5-5 of FIG. 4 to show the read and write elements of the merged magnetic head.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1A:
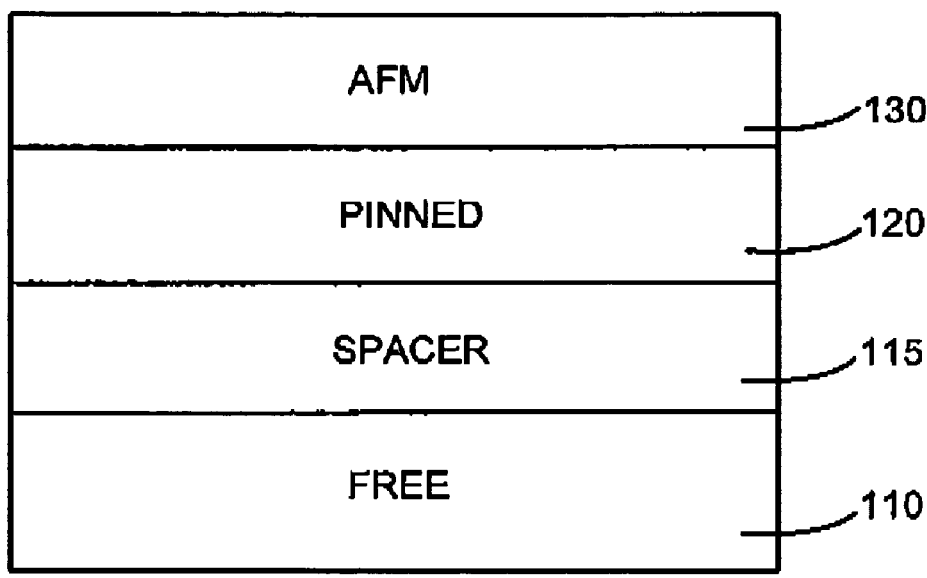
FIG. 1A is an air bearing surface view, not to scale, of a prior art spin valve (SV) sensor.
Figure 1B:
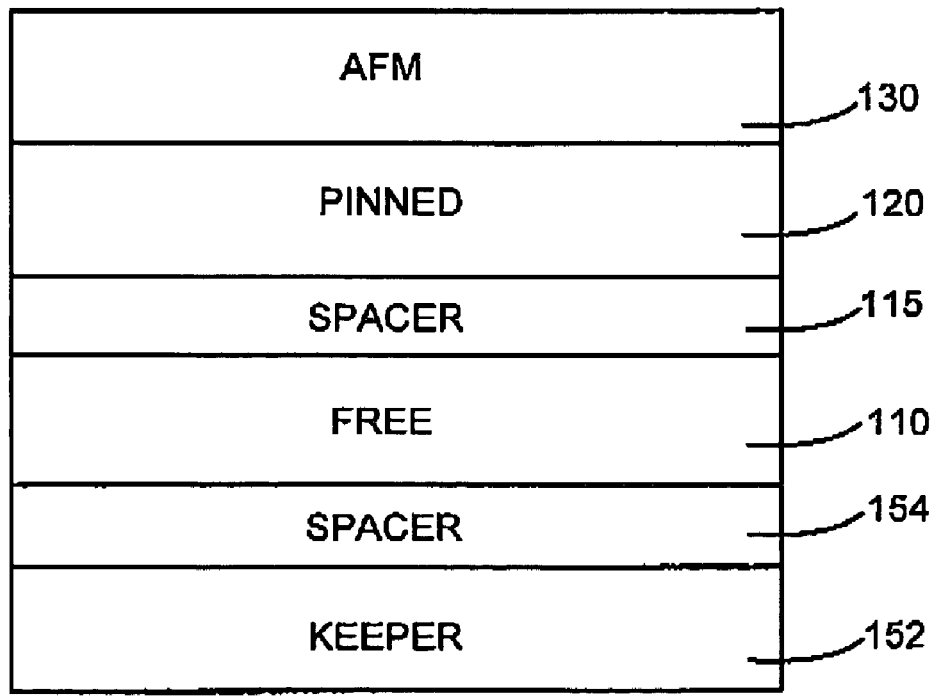
FIG. 1B is an air bearing surface view, not to scale, of a prior art keepered SV sensor.
Figure 2A:
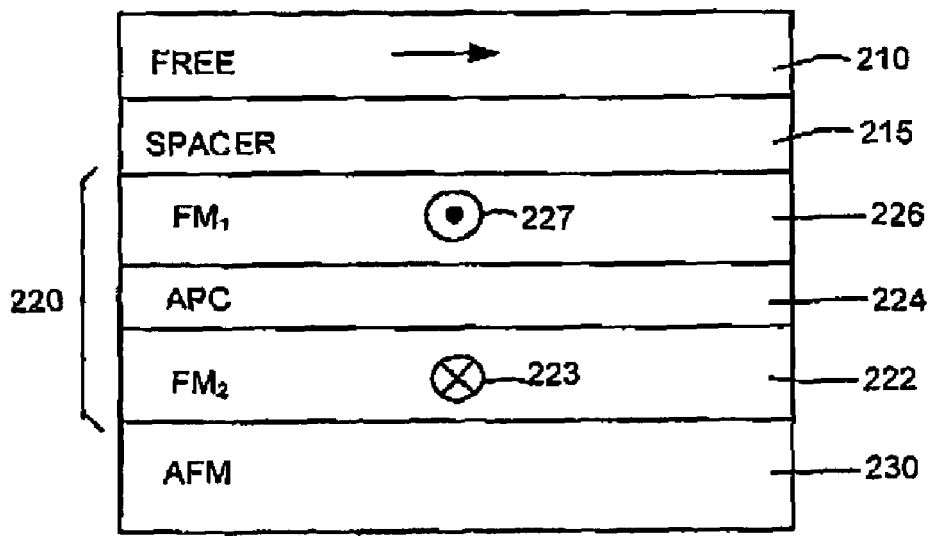
FIG. 2A is an air bearing surface view, not to scale, of a prior art AP-Pinned SV sensor.
Figure 2B:
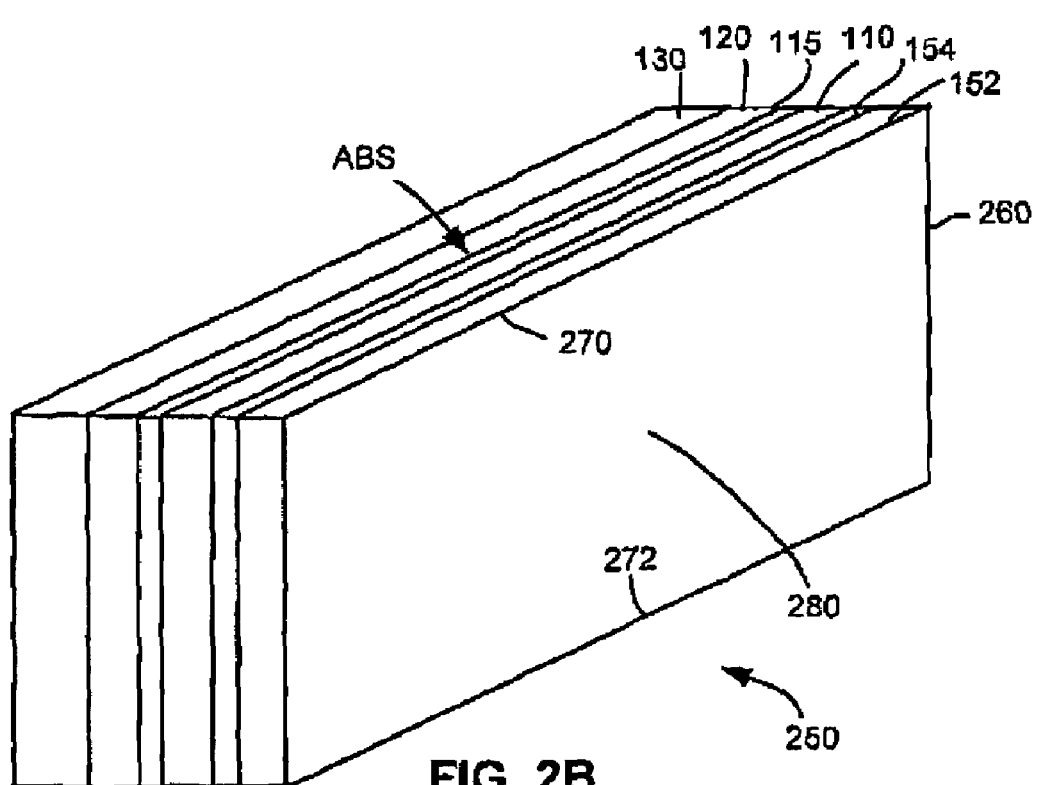
FIG. 2B is a perspective view, not to scale, of a prior art AP-Pinned SV sensor.
Figure 3:
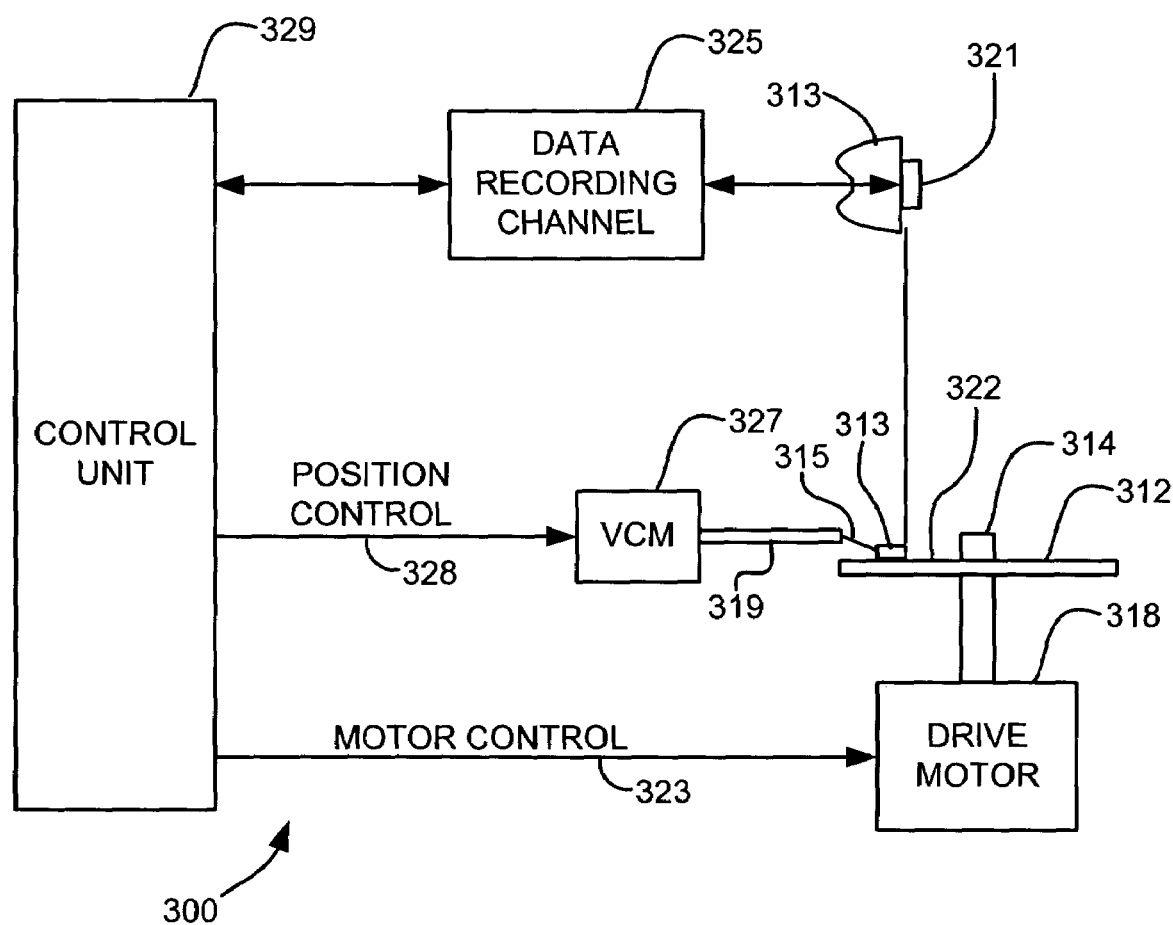
FIG. 3 is a simplified drawing of a magnetic recording disk drive system.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording on each disk is in the form of an annular pattern of concentric data tracks (not shown) on the disk 312.

At least one slider 313 is positioned near the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different tracks of the disk where desired data are recorded. Each slider 313 is attached to an actuator arm 319 by means way of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

FIG. 4 is a side cross-sectional elevation view of a merged magnetic head 400, which includes a write head portion 402 and a read head portion 404, the read head portion employing a dual spin valve sensor 406 of the present invention. FIG. 5 is an ABS view of FIG. 4. The spin valve sensor 406 is sandwiched between nonmagnetic electrically insulative first and second read gap layers 408 and 410, and the read gap layers are sandwiched between ferromagnetic first and second shield layers 412 and 414. In response to external magnetic fields, the resistance of the spin valve sensor 406 changes. A sense current ($I_s$) conducted through the sensor causes these resistance changes to be manifested as potential changes. These potential changes are then processed as readback signals by the processing circuitry 329 shown in FIG. 3.

The write head portion 402 of the magnetic head 400 includes a coil layer 422 sandwiched between first and second insulation layers 416 and 418. A third insulation layer 420 may be employed for planarizing the head to eliminate ripples in the second insulation layer caused by the coil layer 422. The first, second and third insulation layers are referred to in the art as an "insulation stack". The coil layer 422 and the first, second and third insulation layers 416, 418 and 420 are sandwiched between first and second pole piece layers 424 and 426. The first and second pole piece layers 424 and 426 are magnetically coupled at a back gap 428 and have first and second pole tips 430 and 432 which are separated by a write gap layer 434 at the ABS. Since the second shield layer 414 and the first pole piece layer 424 are a common layer this head is known as a merged head. In a piggyback head an insulation layer is located between a second shield layer and a first pole piece layer. First and second solder connections (not shown) connect leads (not shown) from the spin valve sensor 406 to leads (not shown) on the slider 313 (FIG. 3), and third and fourth solder connections (not shown) connect leads (not shown) from the coil 422 to leads (not shown) on the suspension.

Figure 6:
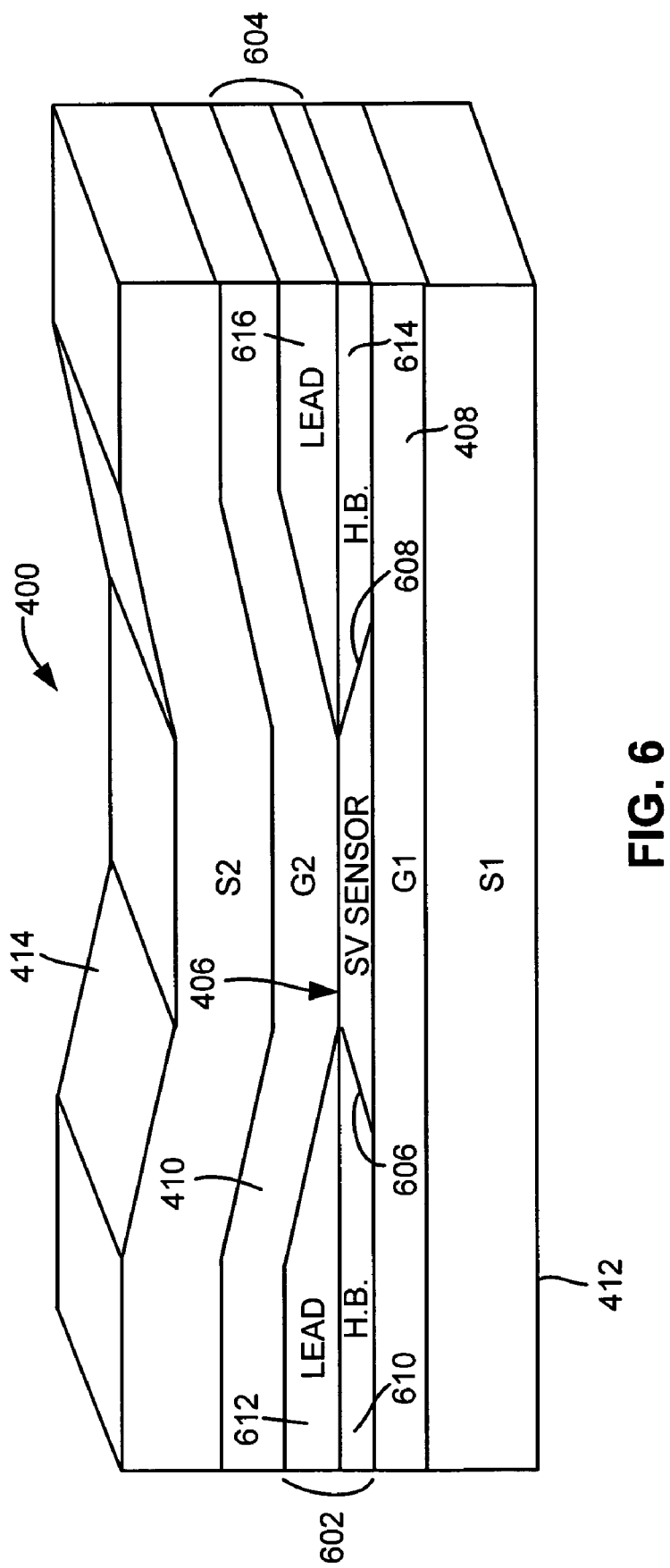
FIG. 6 is an enlarged isometric illustration, not to scale, of the read head with a spin valve sensor.

FIG. 6 is an enlarged isometric ABS illustration of the read head 400 shown in FIG. 4. The read head 400 includes the spin valve sensor 406. First and second hard bias and lead layers 602 and 604 are connected to first and second side edges 606 and 608 of the spin valve sensor. This connection is known in the art as a contiguous junction and is fully described in U.S. Pat. No. 5,018,037 which is incorporated by reference herein. The first hard bias and lead layers 602 include a first hard bias layer 610 and a first lead layer 612 and the second hard bias and lead layers 604 include a second hard bias layer 614 and a second lead layer 616. The hard bias layers 610 and 614 cause magnetic fields to extend longitudinally through the spin valve sensor 406 for stabilizing the magnetic domains therein. The spin valve sensor 406 and the first and second hard bias and lead layers 602 and 604 are located between the nonmagnetic electrically insulative first and second read gap layers 408 and 410. The first and second read gap layers 408 and 410 are, in turn, located between the ferromagnetic first and second shield layers 412 and 414.

The present invention provides new magnetic sensor structures with enhanced self-pinning of the pinned layers of the sensor. The use of additional insulation and/or metallic layers at the track edges of the sensor enhances the compressive stress over the sensor track. The compressive stress in-conjunction with positive magnetostriction of the pinned layers provides enhanced self-pinning. The structures described herein can be incorporated into many types of heads, and the structures are particularly adapted to CPP GMR sensors, CIP GMR sensors, and CPP tunnel valve sensors. Self pinning is particularly important for CPP GMR because it eliminates the contact resistance caused by AFM pinning. Also, the total stack thickness decreases both for CPP GMR and tunnel valve sensors with self pinning, creating a thinner total read gap.

In the following description, the width of the layers (W) refers to the track width. The sensor height is in a direction into the face of the paper. Unless otherwise described, thicknesses of the individual layers are taken perpendicular to the plane of the associated layer and are provided by way of example only and may be larger and/or smaller than those listed. Similarly, the materials listed herein are provided by way of example only, and one skilled in the art will understand that other materials may be used without straying from the spirit and scope of the present invention. Conventional processes can be used to form the structures except where otherwise noted.

Figure 7:
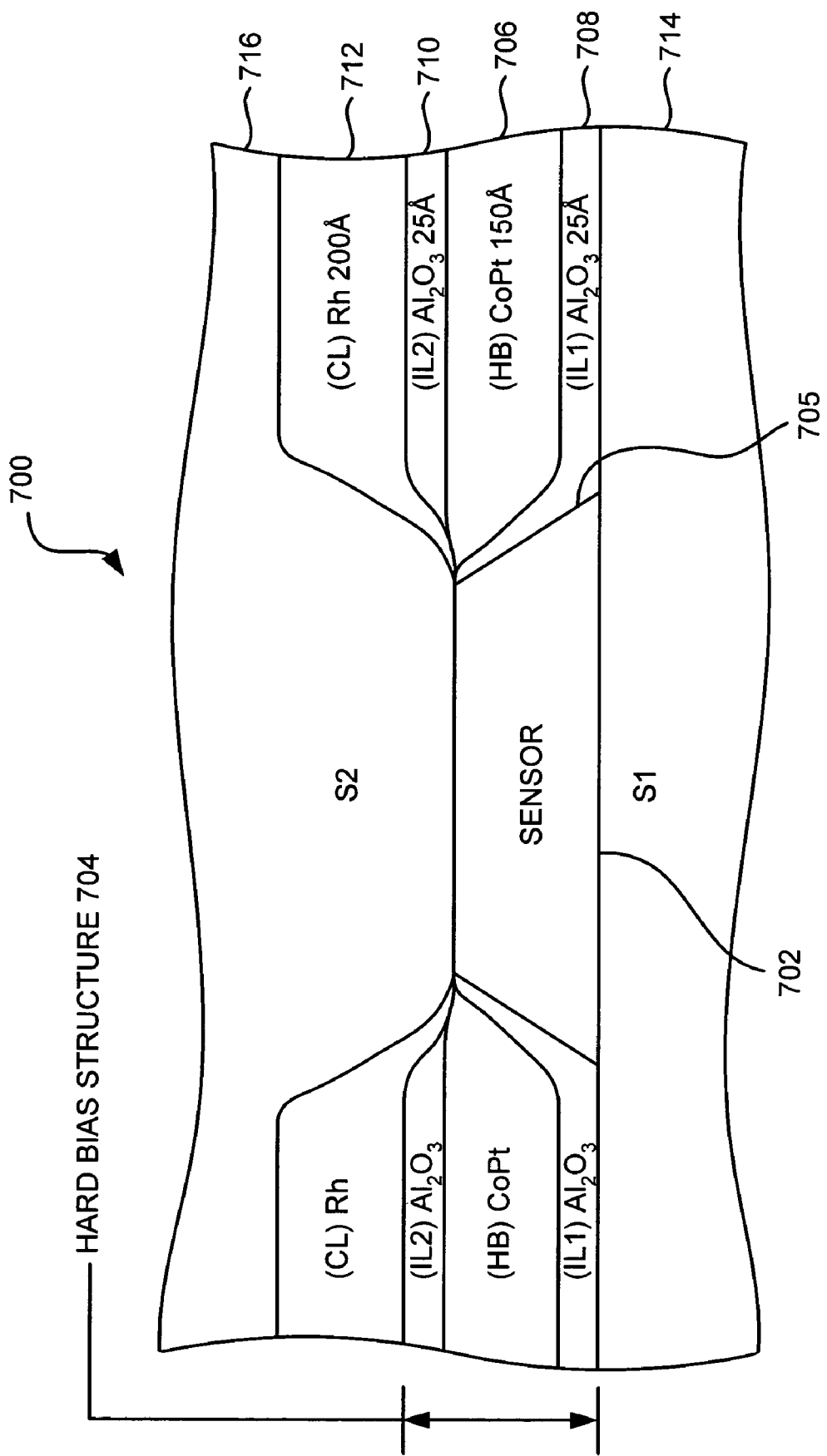
FIG. 7 is an ABS illustration of a sensor structure, not to scale, according to one embodiment of the present invention.

FIG. 7 depicts an ABS view of a sensor structure 700 according to one embodiment. As shown, a sensor 702 is positioned between two bias structures 704, the bias structures being positioned outside track edges 705 of the sensor. The sensor 702 can be a standard sensor 702 of any type but having a pinned layer structure. Illustrative sensors 702 are shown in FIGS. 12-15.

With continued reference to FIG. 7, each bias structure 704 includes a layer of hard bias material 706 which provides the bias to the free layer of the sensor 702 for stabilizing the free layer. Illustrative thicknesses of the hard bias layers 706 are 50-200 Å and exemplary materials from which the hard bias layers 706 may be formed include CoPt, CoPtCr, etc. Each hard bias layer 706 is sandwiched between a pair of electrically insulative layers (IL1), (IL2) 708, 710. Preferred materials from which the insulative layers 708, 710 can be formed include $Al_2O_3$ or other dielectric material.

Compression layers (CL) 712 are formed above each of the bias structures 704. The compression layers 712 provide compressive stress to the sensor 702, which in turn enhances the pinning of the AP pinned layer structure of the sensor 702. As will be described in more detail below with reference to FIG. 12, the pinned layers of the sensor 702 have a property known as magnetostriction. The sensor 702 is also under compressive stress because of its geometry at the ABS. The combination of magnetostriction and compressive stress creates a magnetic anisotropy with easy axis perpendicular to the air bearing surface. This magnetic anisotropy together with the large antiparallel exchange coupling between the pinned layers causes the magnetizations of the pinned layers to be oriented perpendicular to the air bearing surface and antiparallel to each other. Thus, the compression layers 712 add compressive stress to the sensor 702 to enhance the self pinning of the pinned layers of the sensor 702.

While the compression layers 712 can be formed of any suitable material, preferred materials include metals such as Rhodium (Rh), Tantalum (Ta), Tungsten (W) and any combination of these metals. Dielectric materials that provide high compressive stress can also be used. These materials are sputter deposited. Sputter depositing causes the microstructure to form under compression. If the material is under compression, intrinsically it wants to expand. This expansion creates stress onto the surrounding materials, which is transferred onto the pinned layers.

In the embodiment shown in FIG. 7, both the $Al_2O_3$ and metallic layers (Ta, Rh, W) provide compressive stress (about 500 MPa). In one experiment, Rh was shown to provide about 1.5 GPa of compressive stress, while a layer of alumina provided about 300 MPa of compressive stress.

The thicknesses of the $Al_2O_3$ and metallic layers can be optimized to achieve the desired stress level. However, keep in mind that too wide a gap is undesirable, as side reading could occur. Thus, it is preferably to keep thickness of compression layers 712 to between about 2-600 Å, ideally about 100-300 Å or comparable to the thickness of sensor 702.

In conventional CIP GMR heads, leads are formed at the ends. These leads provide compressive stress on the pinned layers of the sensor, enhancing the pinning of the pinned layers. In CPP and tunnel valve sensors, the leads are in the shields 714, 716. In the embodiment shown in FIG. 7, the compression layers 712 are added solely to create compressive stress, and while the compression layers 712 may become energized, no current passes through them between the shields or from the sensor to a shield. Thus, as shown, the compression layers 712 are electrically isolated from at least one of the shields 714, 716 and/or the sensor 702 by the insulative layers 708, 710.

Figure 8:
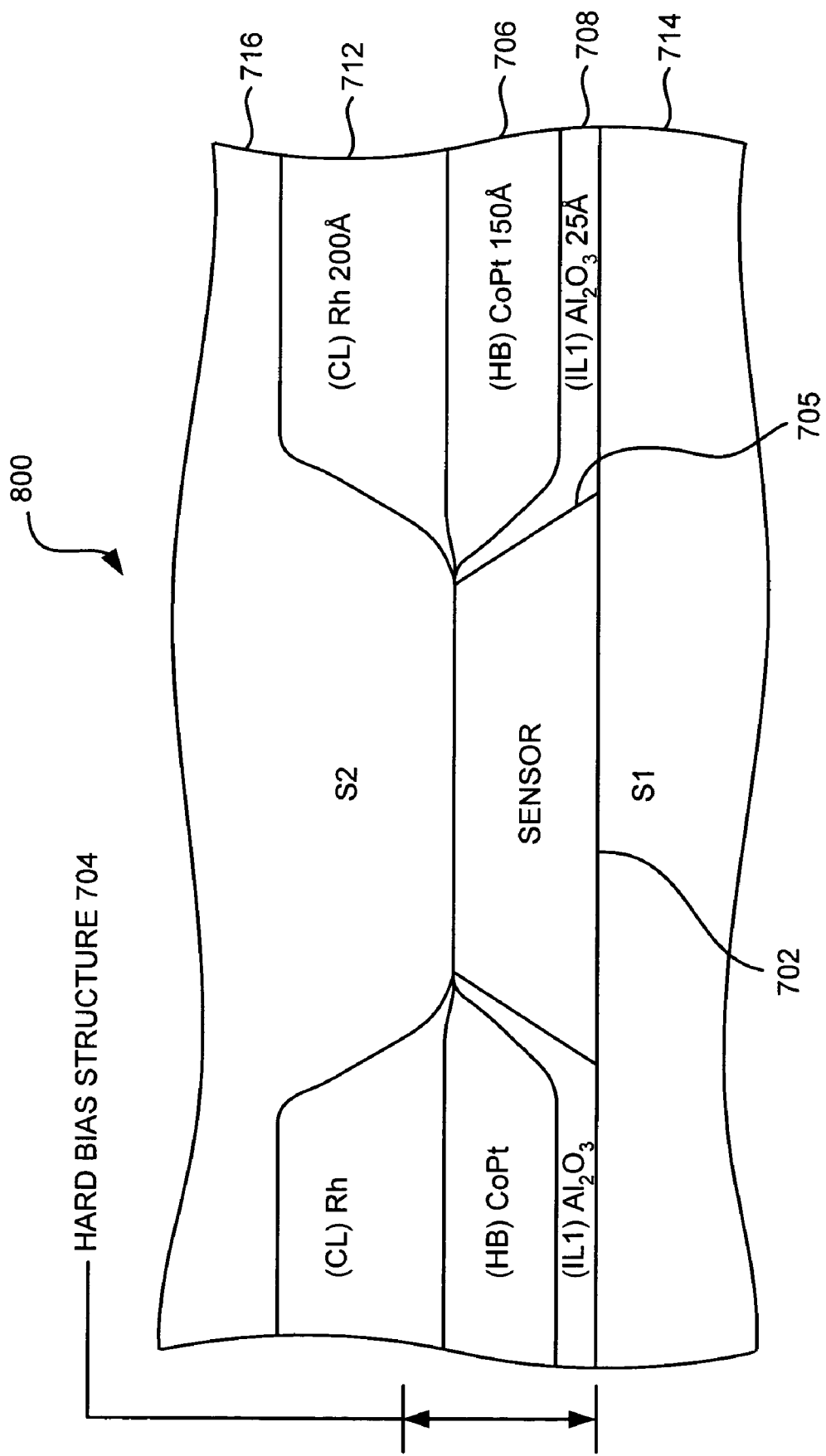
FIG. 8 is an ABS illustration of a sensor structure, not to scale, according to another embodiment of the present invention.

FIG. 8 illustrates a sensor structure 800 according to another embodiment. The structure 800 is similar to the structure 700 of FIG. 7, except that the bias structure 704 includes only one insulative layer 708. This structure 800 may be easier to manufacture, as only one insulative layer need be formed outside the track edges 705 of the sensor 702. Use of the bottom insulative layer 708 is preferred because otherwise the hard bias layer 706 would be in contact with the sensor 702, allowing the current to spread out from the sensor 702 into the hard bias layer 706 and create a short circuit with the lower shield 714.

Figure 9:
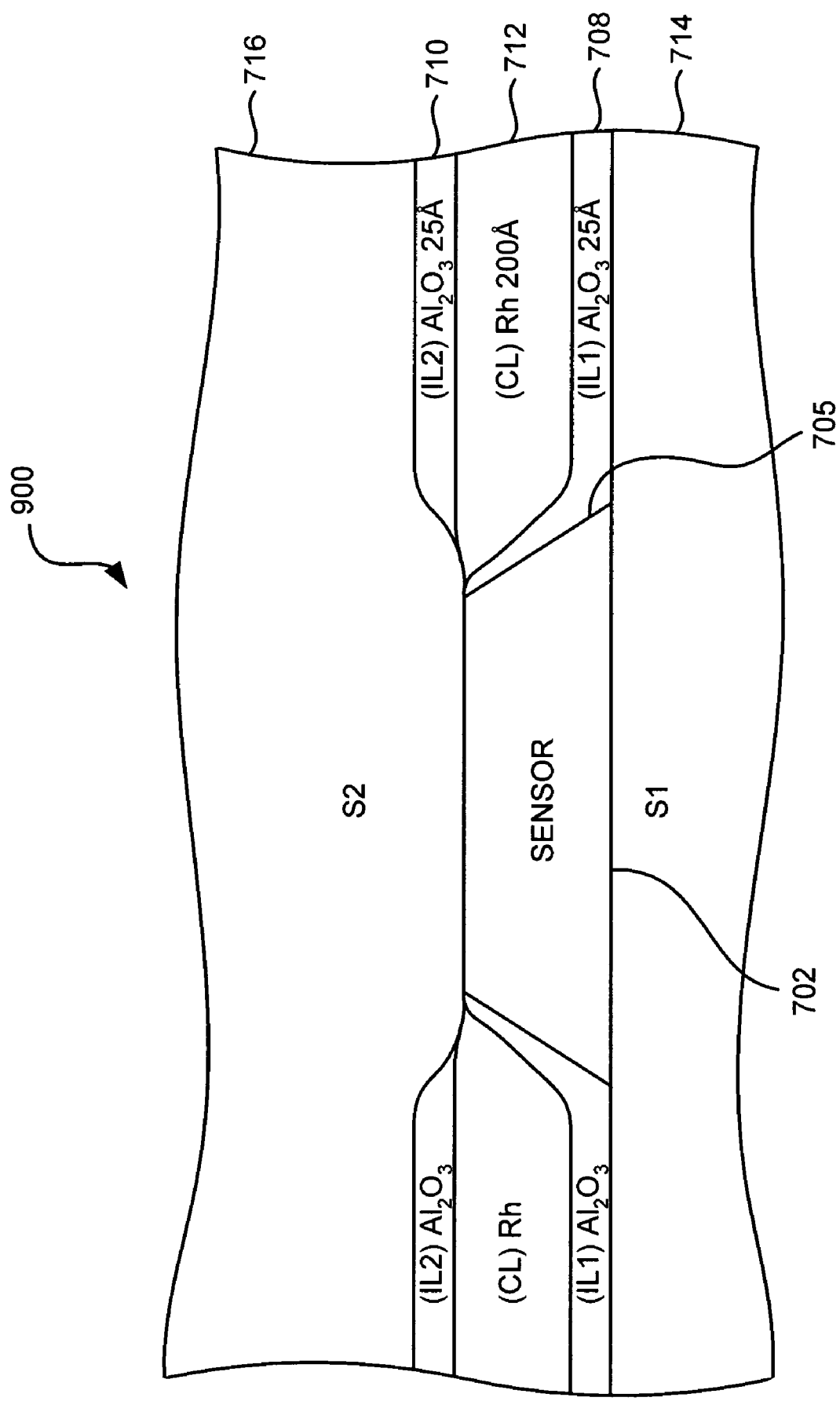
FIG. 9 is an ABS illustration of a sensor structure, not to scale, according to yet another embodiment of the present invention.

FIG. 9 illustrates a sensor structure 900 according to another embodiment. The structure 900 is similar to the structure 700 of FIG. 7, except that the structure 900 does not have a bias structure. Rather the compressive layers 712 are generally aligned with the sensor 702 and are sandwiched by insulative layers 708, 710. In this embodiment, the sensor 702 may have an in stack hard bias layer, eliminating the need for hard bias material in the area in area outside the track edges 705 of the sensor 702.

Figure 10:
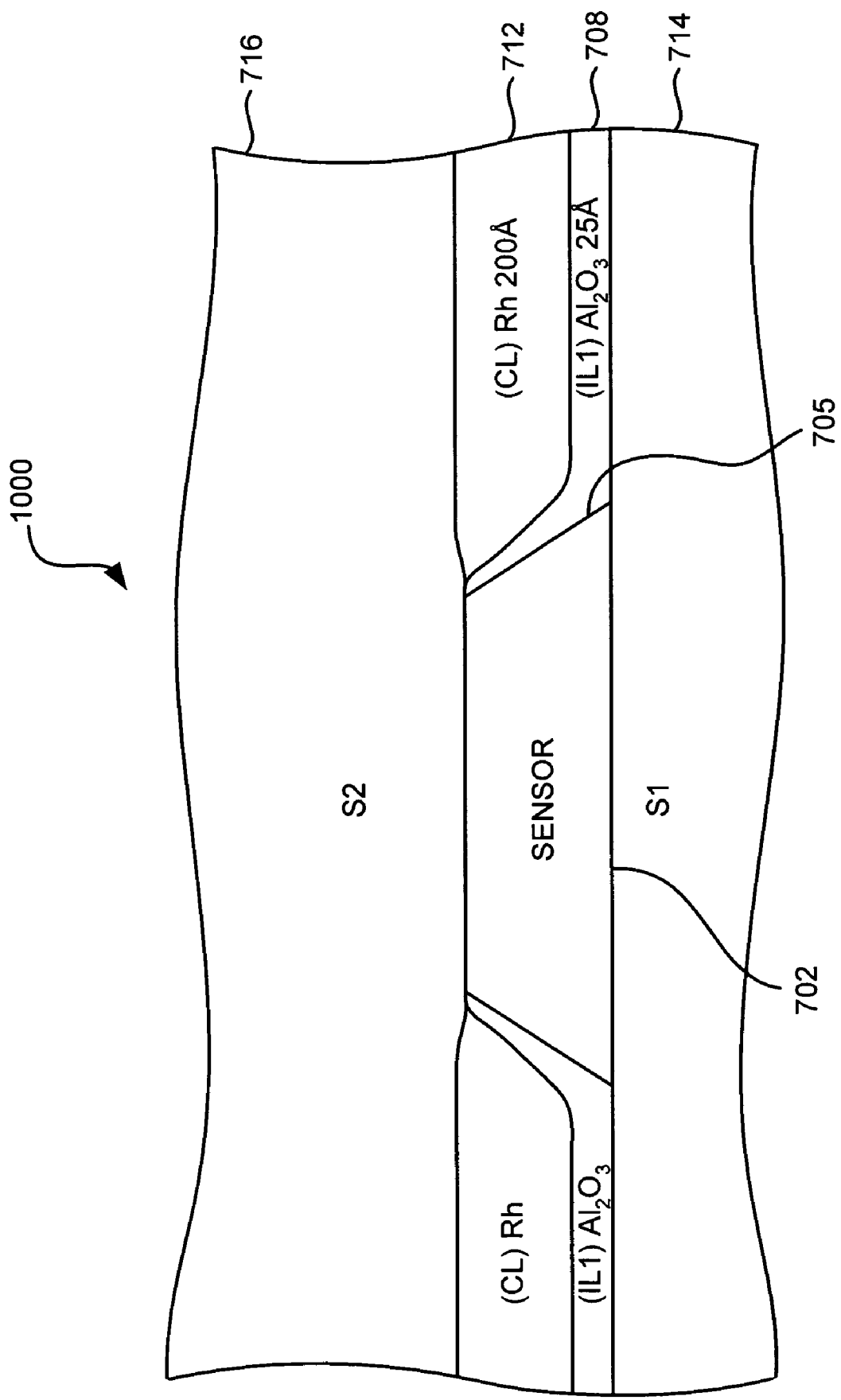
FIG. 10 is an ABS illustration of a sensor structure, not to scale, according to another embodiment of the present invention.

FIG. 10 illustrates a sensor structure 1000 according to a further embodiment. The structure 1000 is similar to the structure 900 of FIG. 9, except that the structure 1000 uses only one insulative layer 708.

Figure 11:
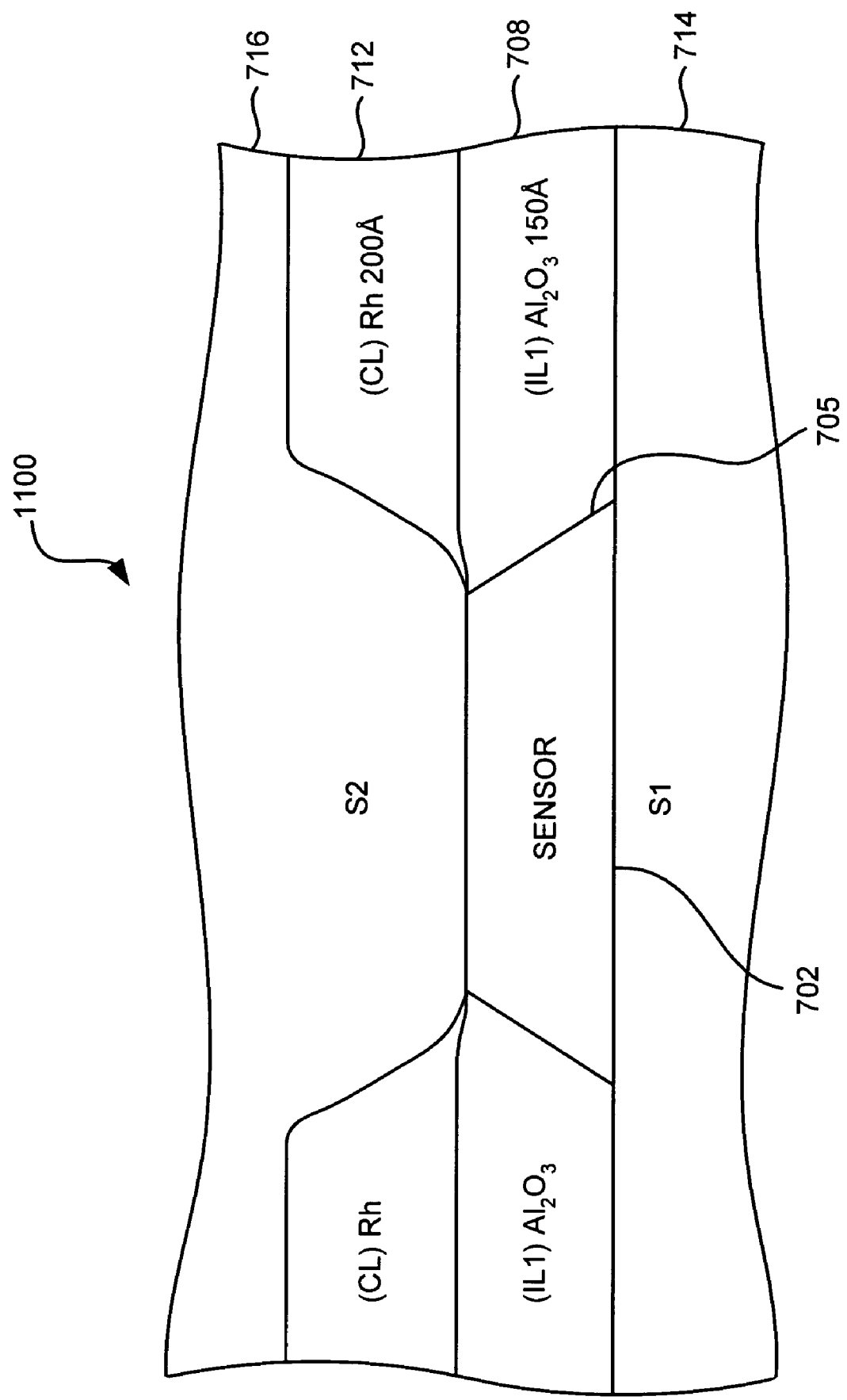
FIG. 11 is an ABS illustration of a sensor structure, not to scale, according to yet another embodiment of the present invention.

FIG. 11 illustrates a sensor structure 1100 according to a further embodiment. The structure 1100 is similar to the structure 1000 of FIG. 10, except that the insulative layer 708 of the structure 1100 is very thick to provide additional compressive stress in conjunction with the compressive layer 712.

Figure 12:
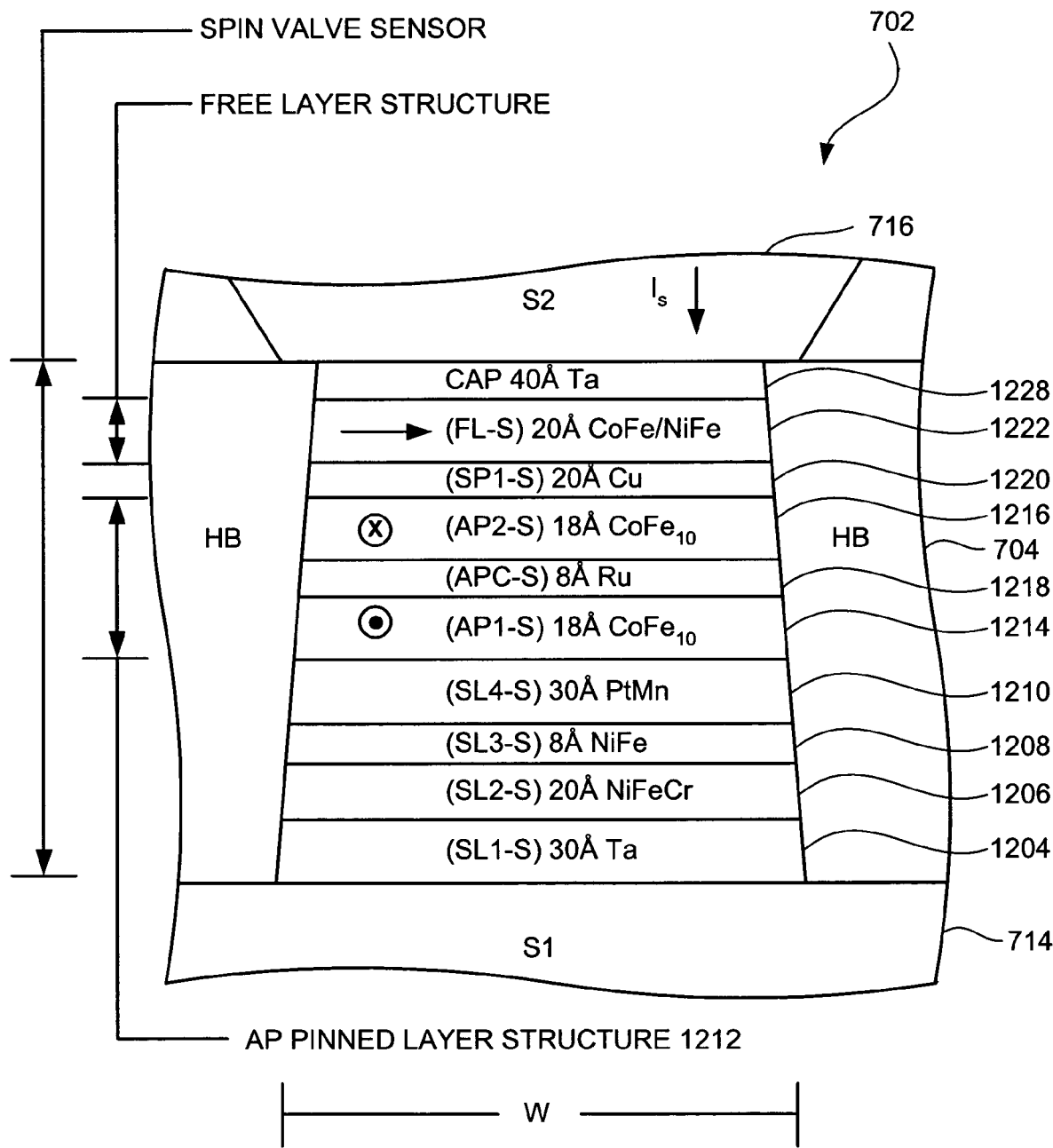
FIG. 12 is an ABS illustration of a CPP GMR sensor, not to scale, according to an embodiment of the present invention.

FIG. 12 illustrates an ABS view of a CPP GMR sensor 702 that can be used with the embodiments described herein, particularly with respect to FIGS. 7-8. Note that other sensor configurations can also be used.

Seed layers are formed on the first shield 714. The seed layers aid in creating the proper growth structure of the layers above them. Illustrative materials formed in a stack from the first shield layer 1202 are a layer of Ta (SL1-S) 1204, a layer of NiFeCr (SL2-S) 1206, a layer of NiFe (SL3-S) 1208 and a layer of PtMn (SL4-S) 1210. Illustrative thicknesses of these materials are Ta (30 Å), NiFeCr (20 Å), NiFe (8 Å), and PtMn (30 Å). Note that the stack of seed layers can be varied, and layers may be added or omitted based on the desired processing parameters and head characteristics.

Then an antiparallel (AP) pinned layer structure 1212 is formed above the seed layers. As shown in FIG. 12, first and second AP pinned magnetic layers, (AP1-S) and (AP2-S) 1214, 1216, are separated by a thin layer of an antiparallel coupling (APC-S) material 1218 such that the magnetic moments of the AP pinned layers 1214, 1216 are self-pinned antiparallel to each other. The pinned layers 1214, 1216 have a property known as magnetostriction. The magnetostriction of the pinned layers 1214, 1216 is very positive. The sensor 702 is also under compressive stresses because of its geometry at the ABS, and the configuration of the layer is such that it produces very large compressive stress. The combination of positive magnetostriction and compressive stress causes the pinned layers 1214, 1216 to develop a magnetic anisotropy that is in a perpendicular direction to the track width. This magnetic coupling through the Ru spacer causes the pinned layers 1214, 1216 to have antiparallel-oriented magnetizations.

In the embodiment shown in FIG. 12, the preferred magnetic orientation of the pinned layers 1214, 1216 is for the first pinned layer 1214, into the face of the structure depicted (perpendicular to the ABS of the sensor 702), and out of the face for the second pinned layer 1216. Illustrative materials for the pinned layers 1214, 1216 are $CoFe_{10}$ (100% Co, 10% Fe), $CoFe_{50}$ (50% Co, 50% Fe), etc. separated by a Ru layer 1218. Illustrative thicknesses of the first and second pinned layers 1214, 1216 are between about 10 Å and 25 Å. The Ru layer 1218 can be about 5-15 Å, but is preferably selected to provide a saturation field of above about 10 KOe, ideally about 200 Oe. In a preferred embodiment, each of the pinned layers 1214, 1216 is about 18 Å with an Ru layer 1218 therebetween of about 8 Å.

A first spacer layer (SP1-S) 1220 is formed above the pinned layer structure 1212. Illustrative materials for the first spacer layer 1220 include Cu, $CuO_x$, $Cu/CoFeO_x/Cu$ stack, etc. The first spacer layer 1220 can be about 10-30 Å thick, preferably about 20 Å.

A free layer (FL-S) 1222 is formed above the first spacer layer 1220. The magnetic moment of the free layer 1222 is soft and so is susceptible to reorientation from external magnetic forces, such as those exerted by data on disk media. The relative motion of magnetic orientation of the free layer 1222 when affected by data bits on disk media creates variations in the sensing current flowing through the sensor 702, thereby creating the signal. Exemplary materials for the free layer 1222 are CoFe/NiFe stack, etc. An illustrative thickness of the free layer 1222 is about 10-40 Å.

The magnetic orientation of the free layer 1222 must be preset during manufacture, otherwise the orientation will be unstable and could move around at random, resulting in a "scrambled" or noisy signal. This instability is a fundamental property of soft materials, making them susceptible to any external magnetic perturbations. Thus, the magnetic orientation of the free layer 1222 should be stabilized so that when its magnetic orientation moves, it consistently moves around in a systematical manner rather than a random manner. The magnetic orientation of the free layer 1222 should also be stabilized so that it is less susceptible to reorientation, i.e., reversing. The structure disclosed stabilizes the free layer 1222.

A cap (CAP) 1228 can be formed above the free layer 1222. Exemplary materials for the cap 1228 are Ta, Ta/Ru stack, etc. An illustrative thickness of the cap 1228 is 20-30 Å.

Figure 13:
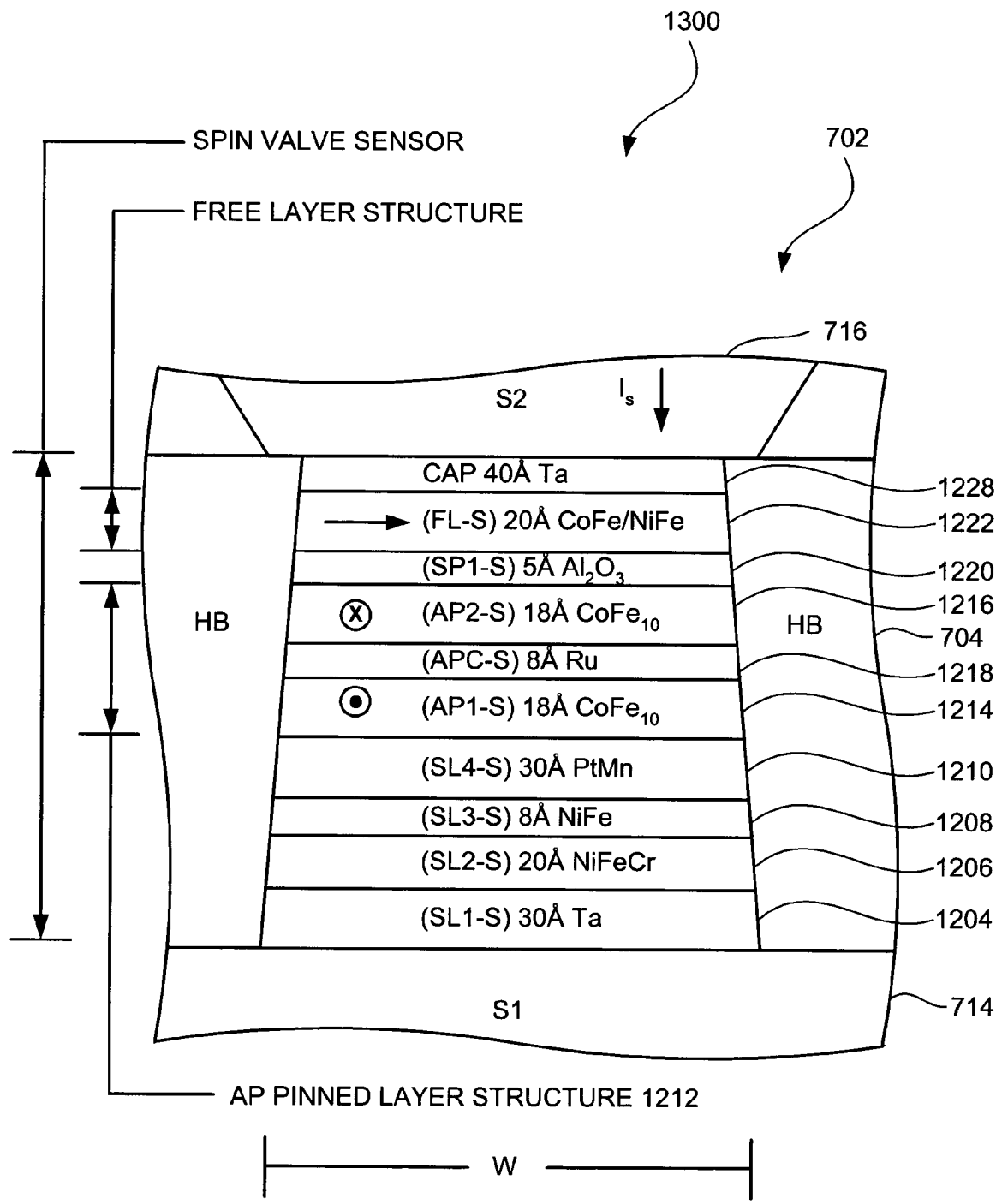
FIG. 13 is an ABS illustration of a CPP tunnel valve sensor, not to scale, according to an embodiment of the present invention.

FIG. 13 depicts an ABS view of a CPP tunnel valve sensor 1300 according to one embodiment. The CPP tunnel valve sensor 1300 generally has the same configuration as the structure shown in FIG. 12, except that the first spacer layer 1220 is formed of a dielectric barrier material, such as, $Al_2O_3$, $AlO_x$, $MgO_x$, etc. The first spacer layer 1220 is very thin such that the electric current passing through the sensor 1300 "tunnels" through the first spacer layer 1220. An illustrative thickness of the first spacer layer 1220 is 3-6 Å.

Figure 14:
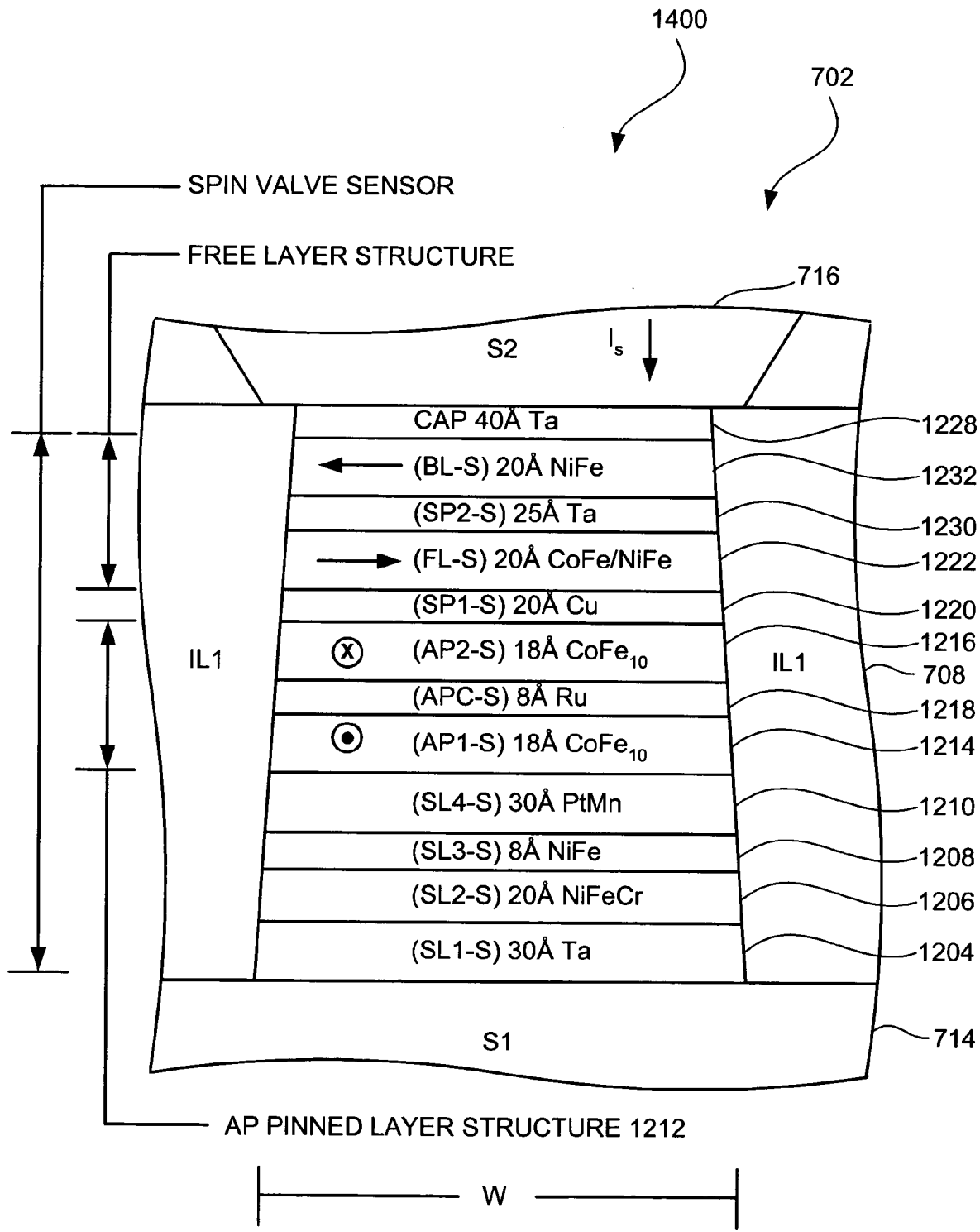
FIG. 14 is an ABS illustration of a CPP GMR sensor, not to scale, according to another embodiment of the present invention.

FIG. 14 depicts an ABS view of a CPP GMR sensor 1400 that can be used with the embodiments described herein, particularly with respect to FIGS. 9-11. Note that other sensor configurations can also be used. The CPP GMR sensor 1400 generally has the same configuration as the structure shown in FIG. 12, except that the sensor 1400 further includes an in-stack bias layer (BL-S) 1232 separated from the free layer 1222 by a second spacer layer (SP2-S) 1230.

The in-stack bias layer (BL) 1232 is formed above the second spacer layer 1230. The magnetization of the bias layer 1232 is pinned parallel to the track width, making the bias layer 1232 act as a permanent magnet. The bias layer 1232 stabilizes the free layer 1222 through exchange coupling. This phenomenon is similar to the AP coupling of the pinned layers, except that the second spacer layer 1230 must not be too thin or the free and bias layers may become permanently pinned and the head rendered practically ineffective.

Exemplary materials for the bias layer 1232 are $NiFe_{10}$, CoNiNb, NiFeX (X=Cr, Mo, Rh, etc.), etc. An illustrative thickness of the bias layer 1232 is about 10-40 Å, and is preferably selected such that it has a magnetic thickness comparable to the magnetic thickness of the free layer 1222 to provide a flux closed structure where the magnetic poles at the free layer edges are eliminated. Also note that where NiFe or NiFeX is used, the Ni/Fe ratio is preferably kept at about $\geq 90/10$ to obtain a large negative magnetostriction, e.g., about $-2 \times 10E^{-5}$. This magnetostriction together with compressive stress yields a Hk of greater than about 750 Oe at the free layer, and preferably about 1000 Oe at the bias layer.

The thickness of the second spacer layer 1230 is constructed such that the magnetic field created by the bias layer 1232 enters the free layer 1222, stabilizing the magnetic orientation of the free layer 1222, preferably so that the magnetizations of the free and bias layers 1222, 1232 are antiparallel. Such thickness of the second spacer layer 1230 in the exemplary embodiment shown in FIG. 7 is about 20-30 Å thick. Also, a magnetic coupling is created between the free and bias layers 1222, 1232 through the second spacer layer 1230, which enhances the stabilizing effect. Note that the magnetization of the free layer 1222 remains soft in spite of the magnetic field of the bias layer 1232, thereby maintaining sufficient sensitivity necessary for reading magnetic media.

The magnetization of the bias layer 1232 is preferably pinned parallel to the track width as opposed to perpendicular to the ABS. This can be accomplished by causing the bias layer 1232 to have a negative magnetostriction by using other materials, such as those listed above, and preferably having a $\geq 90\%$ Ni content. Further, Cr makes the material even more negative. When Nb is added, the material becomes amorphous (not crystalline), causing it to have a more negative magnetostriction. The negative magnetostriction in combination with large compressive stress (created by the geometry of the layer) creates a magnetic anisotropy which is parallel to the track width W, which in turn causes the magnetic orientation of the bias layer 1232 to be pinned parallel to the track width.

Figure 15:
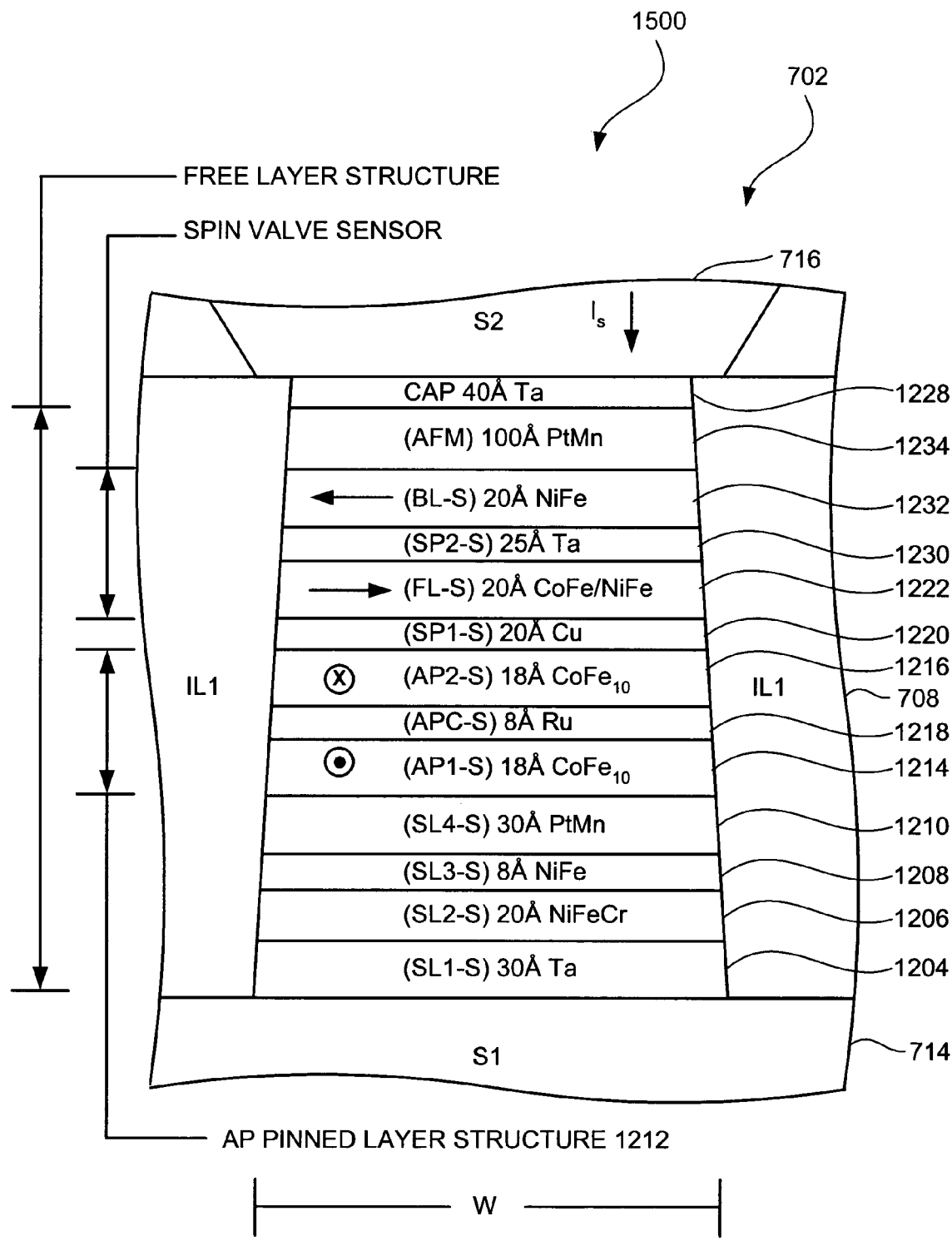
FIG. 15 is an ABS illustration of a CPP GMR sensor, not to scale, according to yet another embodiment of the present invention.

FIG. 15 depicts an ABS view of a CPP GMR sensor 1500 according to one embodiment. The CPP GMR sensor 1500 generally has the same configuration as the structure shown in FIG. 14, except that an antiferromagnetic layer (AFM) 1234 is formed above the bias layer 1232. The antiferromagnetic layer 1234 provides additional pinning to the bias layer 1232 through exchange coupling, thereby stabilizing the bias layer 1232. Preferred materials for the AFM layer 1234 are PtMn, IrMn, etc.

While various embodiments have been described above, it should be understood that they have been presented by way of example only, and not limitation. For example, the structures and methodologies presented herein are generic in their application to all MR heads, AMR heads, GMR heads, spin valve heads, etc. Thus, the breadth and scope of a preferred embodiment should not be limited by any of the above-described exemplary embodiments, but should be defined only in accordance with the following claims and their equivalents.

What is claimed is:

1. A magnetic head comprising:
a sensor having an antiparallel (AP) pinned layer structure, wherein the AP pinned layer structure includes at least two pinned layers having magnetic moments that are self-pinned antiparallel to each other, the pinned layers being separated by an AP coupling layer; and
a pair of compression layers positioned towards opposite track edges of the sensor, the compression layers providing compressive stress to the sensor, the compression layers enhancing the AP pinning of the pinned layers of the AP pinned layer structure.

2. The head as recited in claim 1, wherein the compression layers are constructed of metal.

3. The head as recited in claim 1, wherein the compression layers are constructed of rhodium.

4. A head as recited in claim 1, wherein the compression layers are constructed of tantalum.

5. A head as recited in claim 1, wherein the compression layers are constructed of tungsten.

6. A head as recited in claim 1, wherein the compression layers are constructed of a dielectric material.

7. The head as recited in claim 1, wherein the compression layers are positioned substantially outside the track edges of the sensor.

8. A head as recited in claim 1, wherein the compression layers are substantially aligned with the sensor.

9. The head as recited in claim 1, further comprising hard bias layers positioned below the compression layer, and an electrically insulative layer positioned between each hard bias layer and the sensor.

10. The head as recited in claim 1, further comprising shield layers positioned above and below the sensor, and at least one electrically insulative layer positioned between each of the compression layers and the sensor and one of the shields for preventing conduction of electricity through the compression layers from one shield layer to the other shield layer.

11. The head as recited in claim 1, further comprising shield layers positioned above and below the sensor, and at least one electrically insulative layer positioned between each of the compression layers and the sensor and one of the shields for preventing conduction of electricity through the compression layers from the sensor to one of the shield layers.

12. The head as recited in claim 1, wherein the head s a GMR head, and further comprising at least one shield positioned towards the sensor.

13. The head as recited in claim 1, wherein the head is a CPP GMR sensor, and further comprising an electrically conductive layer above the sensor.

14. The head as recited in claim 1, wherein the head is a tunnel valve sensor, and further comprising a spacer layer formed of a barrier material.

15. A magnetic head, comprising:
a sensor having an antiparallel (AP) pinned layer structure, wherein the AP pinned layer structure includes at least two pinned layers having magnetic moments that are self-pinned antiparallel to each other, the pinned layers being separated by an AP coupling layer;

a pair of compression layers positioned towards opposite track edges of the sensor, the compression layers providing compressive stress to the sensor; and an electrically insulating layer positioned between the sensor and each compression layer, wherein the compression layers are positioned substantially outside the track edges of the sensor.

16. The head as recited in claim 15, wherein the compression layers are constructed of metal.

17. The head as recited in claim 15, wherein the compression layers are constructed, of rhodium.

18. A head as recited in claim 15, wherein the compression layers are constructed of tantalum.

19. A head as recited in claim 15, wherein the compression layers are constructed of tungsten.

20. A head as recited in claim 15, wherein the compression layers are constructed of a dielectric material.

21. A head as recited in claim 15, wherein the compression layers are substantially aligned with the sensor.

22. The head as recited in claim 15, further comprising hard bias layers positioned below the compression layers, and an electrically insulative layer positioned between each hard bias layer and the sensor.

23. The head as recited in claim 15, further comprising shield layer positioned above and below the sensor, and at least one electrically insulative layer positioned between each of the compression layers and the sensor and one of the shields for preventing conduction of electricity through the compression layers from one shield layer to the other shield layer.

24. The head as recited in claim 15, further comprising shield layers positioned above and below the sensor, and at least one electrically insulative layer positioned between each of the compression layers and the sensor and one of the shields for preventing conduction of electricity through the compression layers from the sensor to one of the shield layers.

25. The head as recited in claim 15, wherein the head is a GMR head, and further comprising at least one shield positioned towards the sensor.

26. The head as recited in claim 15, wherein the head is a tunnel valve sensor, and further comprising a spacer layer formed of a barrier material.

* * * * *

UNITED STATES PATENT AND TRADEMARK OFFICE
CERTIFICATE OF CORRECTION

PATENT NO. : 7,330,339 B2  Page 1 of 1
APPLICATION NO. : 10/627506
DATED : February 12, 2008
INVENTOR(S) : Hardayal Singh Gill It is certified that error appears in the above-identified patent and that said Letters Patent is hereby corrected as shown below:

In the claims:
col. 12, line 37 change "compression layer" to --compression layers--;
col. 12, line 55 change "head s a" to --head is a--;
col. 14, line 2 change "shield layer" to --shield layers--.

Signed and Sealed this

Twenty-fourth Day of June, 2008

JON W. DUDAS
*Director of the United States Patent and Trademark Office*